United States Patent

Blakeley

[15] 3,695,638

[45] Oct. 3, 1972

[54] COUPLING FOR PLASTIC PIPE

[72] Inventor: James Blakeley, Thornhill, Ontario, Canada

[73] Assignee: Victaulic Company of America, South Plainfield, N.J.

[22] Filed: March 18, 1970

[21] Appl. No.: 20,531

[52] U.S. Cl. .................285/112, 285/367, 285/373, 285/423
[51] Int. Cl. .............................................. F16l 17/00
[58] Field of Search......285/111, 373, 423, 112, 419, 285/223, 366, 367, 407, 410

[56] References Cited

UNITED STATES PATENTS

| | | | |
|---|---|---|---|
| 2,449,795 | 9/1948 | Stillwagon | 285/112 X |
| 2,369,770 | 2/1945 | Baxter | 285/112 X |
| 2,377,510 | 6/1945 | Newell | 285/112 |
| 1,967,467 | 7/1934 | Damsel | 285/112 X |
| 1,541,601 | 6/1925 | Tribe | 285/112 |
| 3,082,022 | 3/1963 | Moore | 285/423 X |

Primary Examiner—Dave W. Arola
Attorney—Albert M. Parker, Lorimer P. Brooks, Alfred L. Haffner, Jr., Harold Haidt, G. Thomas Delahunty and Charles G. Mueller

[57] ABSTRACT

A mechanical clamp type coupling and joint for joining together the ends of sections of plastic pipe incorporates elements to maintain an effective joint regardless of stress concentration and the effects of flexural or bending forces on the joint. The pipe sections are grooved circumferentially at a position adjacent their ends to receive the key sections of cylindrical segmented coupling housings. A pressure responsive gasket mounted within the housing has lips engaging the exterior of the pipe sections between their grooves and opposed ends. Shoulders forming circumferential sections extend laterally outwardly from the sides of the coupling housings to overlie the pipe outwardly of the grooves. The interior surfaces of these shoulders and the exterior surface of the pipe are concentric and the clearance between them is restricted preferably to a definite tolerance to protect the joint from opening up under flexing or bending forces.

9 Claims, 12 Drawing Figures

JAMES BLAKELEY
INVENTOR.

BY

*Albert M. Parker*

ATTORNEY.

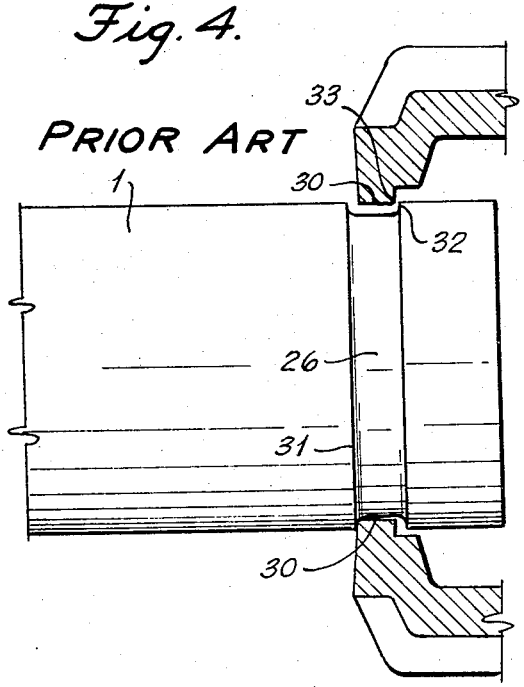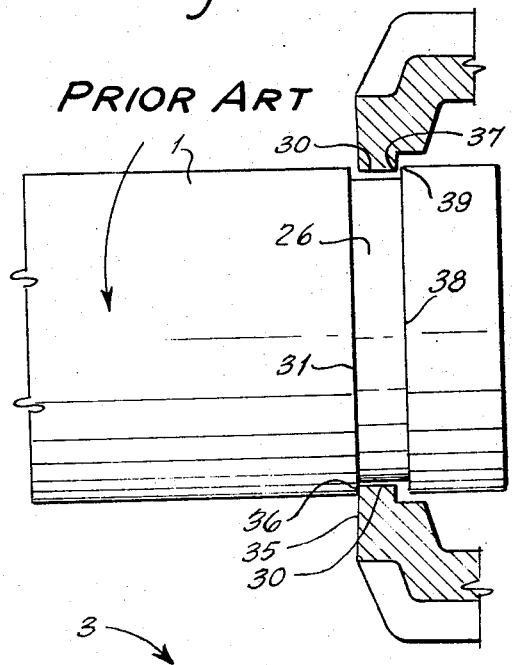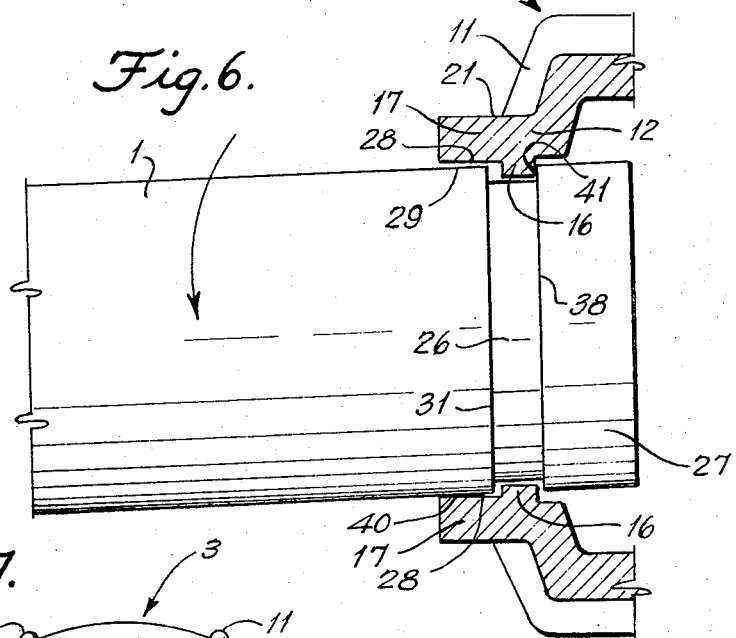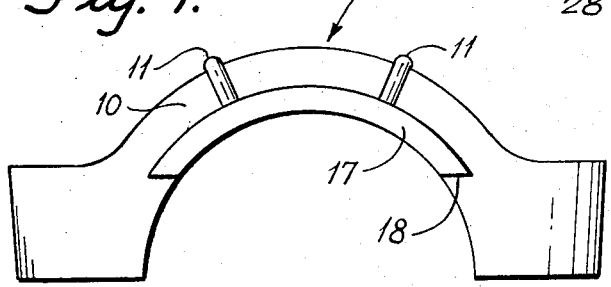

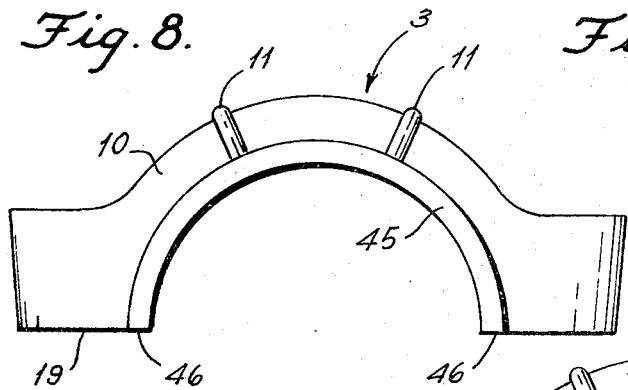
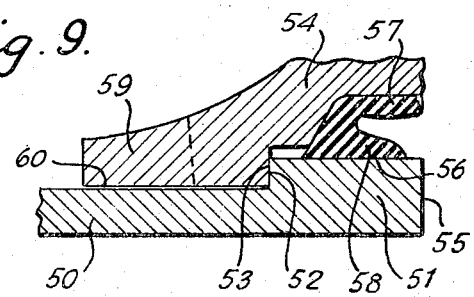
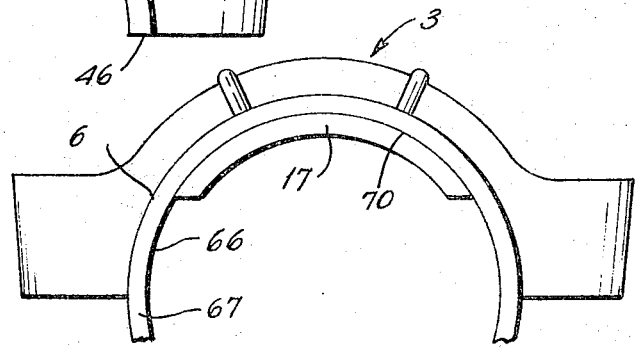
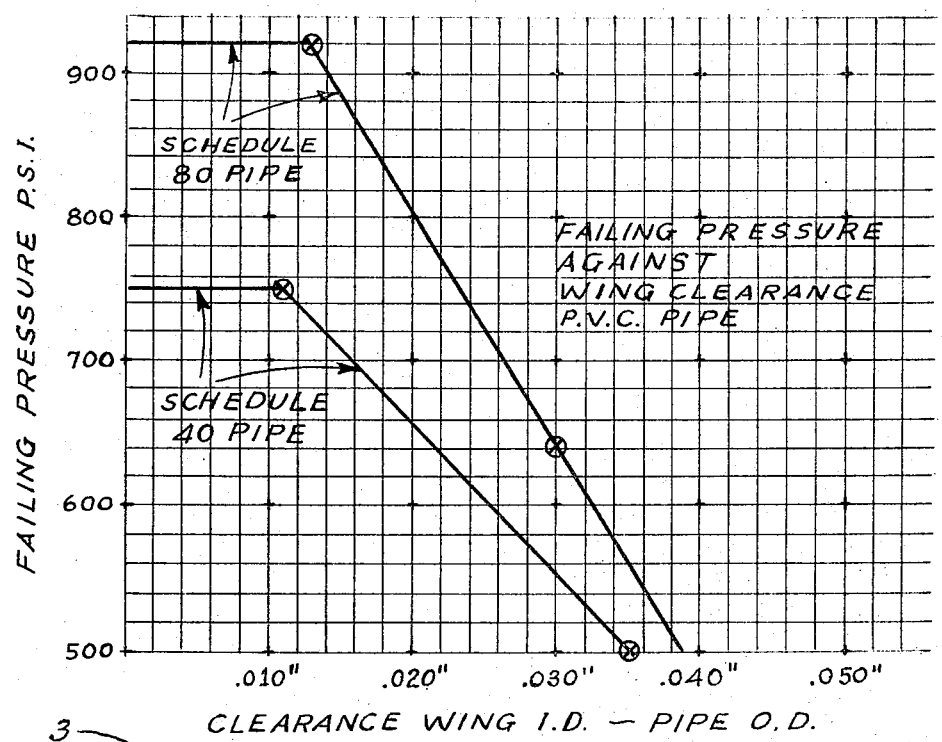
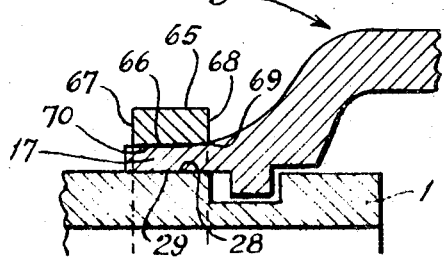
James Blakeley, INVENTOR.

COUPLING FOR PLASTIC PIPE

BACKGROUND OF THE INVENTION

1. Field of the Invention

The joint of the invention is applicable for the securing together of sections of plastic pipe, particularly such as P.V.C. (polyvinyl chloride) or A.B.S. (Poly Acrylonitrile-Butadiene-Styrene) pipe. The coupling and uncoupling of sections of such pipe in simple, effective manner as is done with metal pipe, is desired where economy or particular service requires the use of it. It is particularly so where pipelines of plastic are to be laid down temporarily and are subject to removal from one place to another. Plastic pipe, however, does not have the strength or rigidity of metal pipe and the grooving of it weakens it still more. Thus, for full effectiveness, special provision must be made for joining sections of such pipe to guard against the arising of conditions which would permit the pipe ends to pull apart.

2. Description of the Prior Art

Heretofore in the prior art little has been done in the field of the quick coupling or joining of sections of plastic pipe, particularly such as P.V.C. or A.B.S. since grooved plastic pipe does not make wholly satisfactory joints when joined together by the use of metallic clamp type couplings as practiced in the joining of grooved metal pipe ends.

When coupling metal pipe, particularly that of standard wall thickness, the breadth and size of the groove and the fit of the key sections of the couplings thereinto allow considerable freedom of movement between them. This is allowable because the material has the strength and rigidity to prevent conditions arising where the coupling housings could pull off the pipe ends or cause the pipe ends to break off in their grooved sections under pressures up to those which would burst the pipe. It has been found that with plastic pipe coupling the same as with metal is not fully effective. For instance, when the key meets the groove wall in plastic pipe in a deflected position and internal pressure increases, a shearing of the groove shoulder can take place resulting in the coupling slipping over the sheared section.

SUMMARY OF THE INVENTION

In accordance with the invention plastic pipes of materials such as P.V.C. and A.B.S. can be grooved and coupled together by clamp type couplings engaging those grooves due to the modification of the housings and the pipe-housing relationship introduced by the invention. With circumferential shoulders extending laterally outwardly from the coupling housings, and with those shoulders having an I.D. closely approaching the O.D. of the pipe, fully effective joints are formed. These hold up to the bursting strength of the pipe in spite of strong tendencies of the pipe to deflect within the housings or bend about the key sections. Deflection to an extent to approach pipe shoulder shearing is prevented as is bending of the pipe at the base of the groove about the key.

Though certain relatively hard plastic materials have been referred to above, it is of course to be understood that the coupling of weak, soft, or brittle plastics can be achieved by the use of the modified coupling of the invention. Also, where the wings on the coupling housings and the pipe O.D. fit rather closely, improved joints can be made involving metal pipe since pipe sag will be eliminated and expansion and contraction will take place longitudinally.

The principal object of this invention is to improve upon the joints made between sections of plastic pipe or tubing by means of clamp type couplings.

Another object is to improve upon such couplings themselves.

Another object is to assure the maintenance of adequate contact area between the key sections of clamp type couplings and the receiving grooves therefor in joints formed between sections of plastic pipe.

Still another object is to prevent the key sections of the couplings employed in making such joints from pulling out of the pipe groove as the result of the deflection of plastic pipe within the coupled area.

Still another object is to prevent the bending of plastic pipe in the coupled area of such joints.

A further object is to provide for the maintaining of sections of coupled pipe in alignment regardless of forces tending to disturb the alignment at the coupling.

A still further object is to distribute the forces tending to disrupt joints between sections of plastic pipe over a wider area of the pipe sections.

Still further and more detailed objects of the invention will in part be obvious and in part be pointed out as the description of the invention taken in conjunction with the accompanying drawing proceeds.

In that drawing:

FIG. 4 is a vertical sectional view of a coupling housing in accordance with the prior art applied to a section of pipe showing the relationship of key section and pipe groove when the pipe is deflected within the coupling due to stress concentrations.

FIG. 5 is a similar view in accordance with the prior art illustrating what happens in the prior art when the pipe is bent within the joint.

FIG. 6 is a view similar to FIGS. 4 and 5 but showing the improved coupling housing of the invention and the manner in which it prevents the movement of the key sections with respect to the coupling grooves.

FIG. 7 is an end elevation of a coupling segment showing one form of wing extending laterally therefrom.

FIG. 8 is a similar view showing another form of wing.

FIG. 9 is a fragmentary sectional view showing a coupling housing, provided with a wing in accordance with the invention, engaged with a shoulder on the pipe rather than a groove therein.

FIG. 10 is a fragmentary sectional view,

FIG. 11 is an end elevational view of a modified form of the invention wherein a coupling housing equipped with wings in accordance with the invention has those wings forced down against its pipe by a ring driven into position over the wings; and FIG. 12 is a graph showing test results of failing pressure plotted against wing clearance in accordance with the invention.

Figure 1:
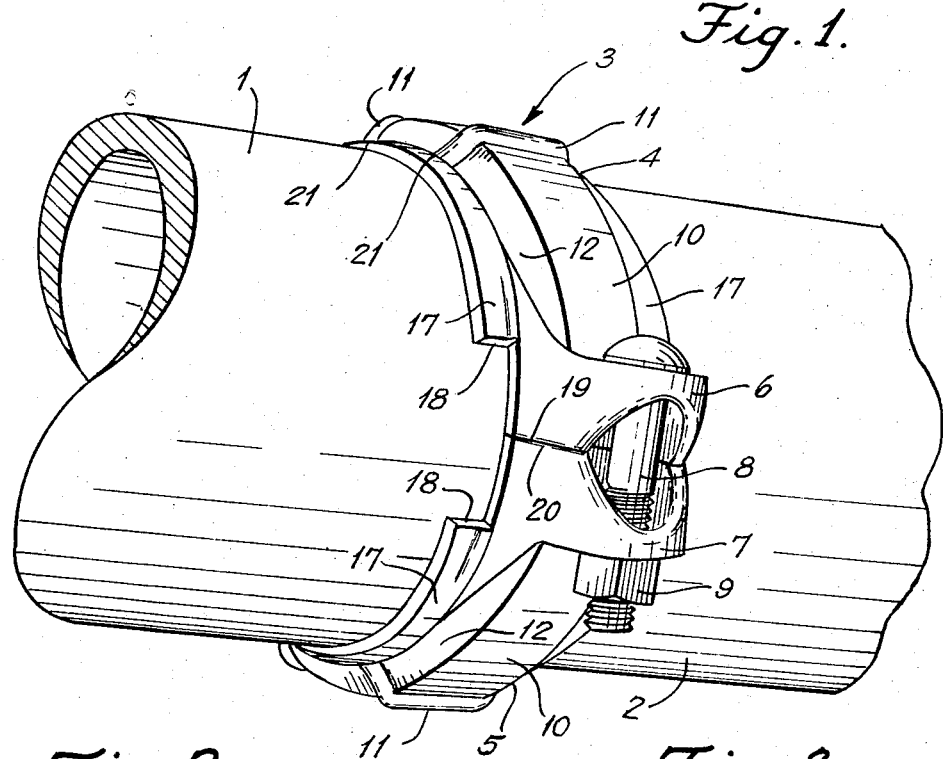
FIG. 1 is a perspective view of a joint between sections of plastic pipe employing the improved couplings in accordance with the invention.
Figure 2:
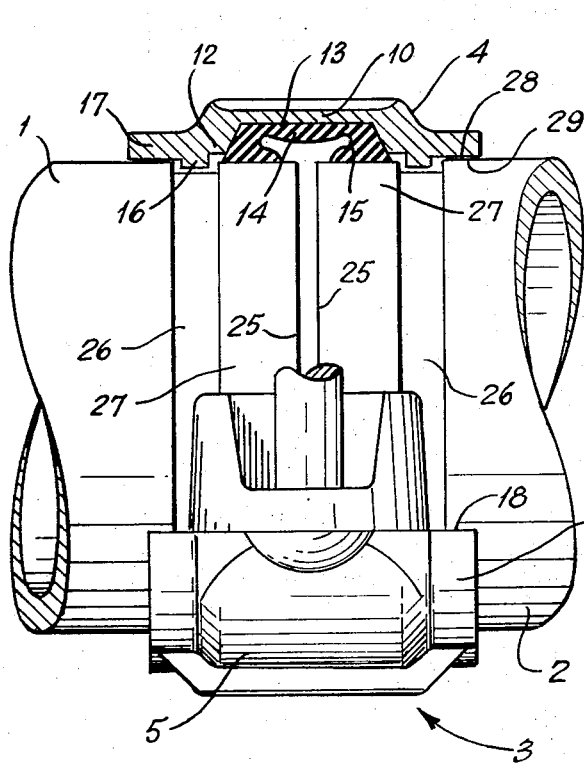
FIG. 2 is a part elevational, part sectional, view of the joint of FIG. 1.
Figure 3:
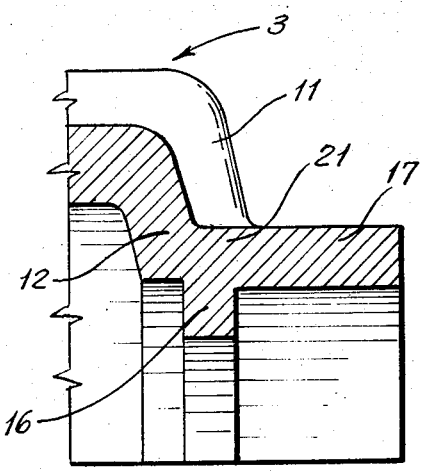
FIG. 3 is a elevational view of the improved coupling housing segment in accordance with the invention.

In FIGS. 1 and 2 sections of plastic pipe 1 and 2 are shown as joined together by a clamp type coupling generally indicated at 3, which in this instance is made up of two hemicylindrical coupling housing segments 4 and 5. It is, of course, to be understood that a greater number of segments may be used to make up the cylinder if desired. The housing segments 4 and 5 terminate in outwardly extending opposed bolt pads 6 and 7 through which a bolt 8 is passed to receive a nut 9 for drawing together the segments 4 and 5 about the pipe ends being joined.

Each of the segments 4 and 5 is formed with a central base portion 10 in the form of a narrow cylinder which, as shown, has transverse strengthening ribs 11 extending across its outerside. The base portion 10 terminates at its sides in shoulder portions 12 thereby providing an annular cavity 13 for reception of a pressure responsive gasket 14. Such gasket has peripheral inturned lips 15 for engagement with the portion of the outer surface of the pipe between the groove and the pipe end.

The shoulder portions 12 also provide radially inwardly extending ribs or key sections 16 normally of generally rectangular cross section and formed to be received in grooves in pipes as will be described. In accordance with the invention the shoulder portions 12 are also provided with supporting wings 17 which extend laterally outwardly from the outer sides of those shoulder portions. These wings 17 are segments of cylinders which are formed integrally with the housings and normally extend around a substantial portion of each housing segment. As here shown they terminate at ends 18 spaced away from the ends 19 and 20 of the segments. The circumferential extent of the wings 17 as shown in FIG. 1, and more clearly in FIG. 7, is sufficient for the intended purpose. It is also to be noted that the transverse strengthening ribs 11 extend to and support the wings 17 at the positions 21.

Turning now to FIG. 2 in particular, it will be seen that the pipe sections 1 and 2 adjacent their ends 25 have grooves 26 of generally rectangular cross section (as here shown) formed thereinto through their exterior surfaces. This leaves short sections of ungrooved pipe 27 between the grooves 26 and ends 25 against which the gasket lips 15 engage.

The width of the grooves 26 is shown as being somewhat greater than the width of the key sections 16, thereby allowing for a small amount of longitudinal movement of the pipe sections within the coupling. Also the inner faces of the key sections 16 are seen to be spaced slightly from the bases of the grooves 26 so as to allow the freedom of movement provided by the excess of width of the groove 26 over the width of the key sections 16.

As regards the support wings 17, it is important to note that as here shown their inner cylindrical surfaces 28 have an I.D. which is close to, though slightly greater than, the O.D. of the pipes 1 and 2. Thus throughout the portions of the bands 29 of the pipes which the wings 17 overlie, there is substantially a close fit between the surfaces 28 and 29. This is not so close as to preclude the longitudinal movement of the pipes provided for by the width of the grooves 26 but it is close enough that it allows but little departure from the mated rectangular relationship of the key sections 16 and grooves 26.

Just how effective the wings 17 are in assuring a satisfactory joint between grooved pipe sections and coupling housings having key sections for reception in these grooves is illustrated by the showing of the invention in FIG. 6 as against the defects in the prior art as illustrated in FIGS. 4 and 5. In the FIG. 4 showing, a pipe section 1 shown as grooved at 26 has that groove engaged by key sections 30 in accordance with the prior art. The pipe is shown as deflected about the coupled area due to stress concentrations within the pipe. The result of this is that in the position at the bottom of the figure the key section 30 is forced over against the side wall 31 of the groove 26 and has its base canted with respect to the base of the groove 26, whereas at the position at the top of the figure the corner edge 33 of the key section is almost out of the groove 26. That edge is engaging the side wall 32 of the groove so close to the top of the groove that it could readily shear off the small amount of material in back of the groove wall 32 and thus slip out of the groove. Only small additional distortion would bring this about.

Similarly, in FIG. 5, the result of the bending of a section of plastic pipe within a prior art coupling housing is illustrated as providing about the same key section-groove relationship as seen in FIG. 4. Here the bending action in the direction of the arrow shown, causes the side portion 35 of the key section to fulcrum about the edge 36 formed by the meeting of the groove side wall 31 with the outer surface of the pipe 1. At the same time the face 30 of the key section is forced in towards the base 26 of the groove at a small angle with respect thereto as shown.

At the opposite end of the pipe diameter the key section is moved up outwardly of the groove as seen by the space between the face 30 and the base of the groove 26 in the upper part of FIG. 5. The key section is also moved across the groove so that its inner corner 37 engages the opposite side wall 38 of the groove at a position 39 only a small distance downwardly from the outer surface of the pipe. The condition shown here is one where the bending moment has not yet reached the point where the edge 37 will start to shear off the pipe material at 39 resulting in the coupling housing jumping out of the groove. It is quite apparent, however, that a small additional bending moment will cause the joint to fail in that manner. The plastic material, being relatively weak and sheer as compared with metals, will thus allow joint failure at relatively low pressure.

The manner in which the coupling housings of the invention, with their laterally extending wings, protect against the deficiencies of the prior art as illustrated in FIGS. 4 and 5, is shown in FIG. 6. Here, the partial circumferential wings 17, as illustrated in FIGS. 1 and 9, extend over the pipe surface to an extend substantially equal to the width of the groove 26. The I.D. 28 of the wings is only a little greater than the O.D. of the pipe surface 29 which they overlie. By the addition of these wings, however, the deficiencies of the joints of FIGS. 4 and 5 are eliminated.

Though the pipe be deflected under stress as in FIG. 4 or bent as in FIG. 5 it is readily seen from the FIG. 6 showing that when the wings 17 are added the key section 16 remains substantially centered within the groove 26. The key section 16 is displaced radially from the base of that groove only a small distance, if any, from its normal relation with respect thereto. This is due to the fact that as the pipe 1 is flexed or bent so that its main portion tends to move downwardly with respect to the coupling housing, as indicated by the arrow, that action is almost immediately checked by the engagement of the inner surface 28 of the lower wing 17, particularly towards the outer portion 40 of that wing, against the outer surface of the pipe 1. Thus the wings by acting to distribute the deflecting stress over a considerably greater and circumferentially enlarged area, over anything in the prior art, prevent disturbance of any substance at the joint.

Looking at the upper end of the diameter of the pipe in FIG. 6, it is readily seen that the key section 16 is still well within the groove 26 and that its side wall 31 still has substantial surface to surface contact with the side wall 38 of the groove. This precludes any likelihood of the key sections shearing off the corner between the groove wall and the outer surface of the pipe and thus jumping out of the groove.

As will be appreciated by those skilled in the art, the mated relationship between the base of the grooves and the I.D. of the key section in clamp type joints is an actual, rather than a dimensioned one between the base of the grooves and the I.D. of the key section. The key sections are so constructed that when the coupling housings, made in accordance with pipe sizes, are secured with normal tightness the I.D.'s of the key sections will just clear the bases of the grooves, thereby allowing for the commonly desired flexibility of movement of the pipe ends in the coupling housings. On the other hand, with the same coupling housings and pipe grooves the tightening of the housings with respect to the pipes can usually be effected to such an extent that the I.D.'s of the key sections are broughtly tightly into engagement with the base of the groove. This is one prior art way of forming a substantially rigid joint when metal pipes and metal couplings are used together. It would not, however, necessarily have that effect when plastic pipes are used and might be damaging to the pipes in view of the flexibility of the plastic and its weakness in shear. Thus the preferred relationship for plastic pipes and couplings is that where the key sections of the couplings are dimensioned to allow a clearance between their I.D. and the O.D. of the pipe groove when the couplings are brought home with normal tightness.

With respect to the relationship between the I.D. of the wings, such as 17, and the O.D. of the pipe which they overlie, the question of clearance between pipe O.D. and wing I.D. is of considerable significance. For illustrative examples reference is made to the graphs of FIG. 12, showing the results of tests conducted using 6-inch P.V.C. pipe deflected to approximately 2° with a satisfactory joint being one which is still fully effective when the pipe itself fails by bursting due to the pressure applied.

The curves of FIG. 12 are the result of plotting clearance between pipe and wings against internal pipe pressure for schedule 40 and 80—6-inch P.V.C. pipe in pounds per square inch. From these curves it is seen that the effectiveness of coupling in accordance with the invention increases in relation to decrease in clearance until a point is reached where the couplings stand up against the maximum pressure the pipe will take without bursting. With clearance greater than the minimum, the results are still superior to those obtained using prior art coupling without wings. However, when the clearances were reduced to substantially the minimum allowing movement between the pipes and couplings the curves suddenly turn to the horizontal and remain there as the clearance is reduced even further. As seen by the illustration taken from these tests, the abrupt turn took place at between 0.010 and 0.012 inches clearance for schedule 40—6-inch pipe and between 0.012 and 0.014 inches for schedule 80—6-inch pipe, the horizontal line indicates the pressure sufficient to burst the pipe in each instance. Though the curves of FIG. 12 show the results of one series of tests they are believed to be relatively characteristic of the results that can be achieved by applying the invention to pipe of other sizes.

In the modification of FIG. 8 the coupling housings 3 are the same as that previously described with the exception of the extent of the lateral wing. In this case the wings 45 extend out from both sides of the housings, and continue for the same full portion of a circumference as does the housing itself. As shown in FIG. 8, the housing is of a full half a cylinder and the wing 45 shown extends to ends 46 thereof which correspond with the bolt pad end surfaces 19 of the housing. Here, again, as in the form of FIGS. 1, 2 and 7, transverse reinforcing ribs 11, extending across the housing to support the wings, are provided. Though only two are shown, spaced further apart than in the case of FIG. 7, additional ones may be included if desired.

Reinforcing ribs 11 are only really needed where the pipe material is relatively unyieldable, such as in very hard plastics or even metal. With plastic material that yields, the yieldability of the plastic is greater than the tendency of the wings to be deflected when brought into contact with the pipe surface as a result of the deflection or bending of the pipe. With regard to the continuous wing of FIG. 8, it would be appreciated that the geometry of it provides a supporting effect against yielding at any particular position.

In FIG. 9 the pipe 50 is shown as being provided with an enlarged end 51 which in turn provides a shoulder 52 against which a shoulder 53 of the coupling housing 54 can engage. The enlarged portion 51, between the shoulder 52 and the pipe end 55, provides a seat 56 for the pressure responsive gasket 57.

In the FIG. 9 construction there is no double sided groove in the pipe and no key section on the coupling having portions engaging the sides of the groove as in FIGS. 4 and 5. Nevertheless the tendency for the surface 53 of the coupling housing to work up and shear off the top corner of the shoulder 52 would still exist if this were not overcome by the provision of wings 59 in accordance with the invention. The sings 59 extend well out laterally from the side of the coupling housing and, for full effectiveness, have the clearance between their bottom surfaces 60 and the upper surface 50 of the pipe restricted to the range referred to heretofore.

Referring to FIGS. 10 and 11, it will be seen the coupling housings and the engagement of the same with the pipe, insofar as the grooves and key sections are concerned, is the same as in FIGS. 1, 2, and 7. Thus, like parts carry like reference characters. Here, however, an additional feature has been added in the form of a continuous clamping ring 65. This ring, preferably of metal, is substantially rectangular in cross-section, but has a bottom surface 66 which is inclined slightly upwardly from the outer end 67 of the ring to the inner end 68 thereof.

The purpose of the ring 65 is to provide a member that can be driven on over the wings 17 and thus force those wings down into tight engagement with the surface of the pipe at 29. Thus it will be apparent that the commencing end 69 of the ring surface 66 is of such a radius that the ring 10 is initially introduced from the left hand side as seen in FIG. 10 on to the beginning of the upper surface 70 of the wing. From there on the ring is driven on over the wings 17 whereby the inclined surface 66 forces the wings 17 down against the pipe, creating a rigid joint.

If desired, however, the rings 65 may serve an additional function, for inasmuch as the ring is continuous and overlies the wings from both of the coupling segments, it can take the place of the normal clamping bolts 8. When this is done it will of course be necessary to have such continuous rings on both sides of the coupling housings, though this is normally the case when the rings are used merely to provide rigid joints.

Though the invention has been described principally from the standpoint of the coupling of pipes formed of relatively rigid plastic materials, such as PVC and ABS, the type of plastic to be used of course depends upon the service to which the piping is to be put. Furthermore, though the preferred and several modified embodiments of the invention have been shown in the accompanying drawing and described in the foregoing specification it is to be understood that other variations and modifications may well be devised by those skilled in the art without departing from the spirit and scope of the invention.

I claim:

1. In coupling constructions for grooved end pipes, a coupling housing element formed of rigid material and forming a segment of a cylinder, said housing element comprising a base portion, side portions at both sides of said base portion extending radially inwardly to form a gasket receiving channel between said side portions and said base portion, each of said side portions being integrally formed with radially inwardly extending portions providing key sections in the form of ribs having straight sides extending throughout substantially the circumferential length of said segment and a radially extending surface facing axially inwardly of the housing element, and said side portions being formed with laterally outwardly extending wing portions extending outwardly with respect to said key sections a distance substantially greater than the width of said key sections so as to overlie said pipe surface beyond the groove therein a greater distance than the width of said key sections, said wing portions having a curvature concentric with the curvature of said housing element, said wing portions extending a shorter circumferential distance than the circumferential extent of said housing element and the inner surfaces of said wing portions being of an interior diameter greater than the interior diameter of said radially extending surface of said inwardly extending portions but only slightly greater than the outer diameter of the pipe to be joined by a coupling formed of a plurality of said housing elements, and means formed on said housing element for joining the same to an adjacent housing element.

2. In coupling construction as in claim 1, said housing element being formed with exterior reinforcing ribs, said exterior reinforcing ribs extending across said housing element and engaging said wing portions to reinforce the same against flexing.

3. A pipe joint made up of sections of grooved end pipe and a coupling housing surrounding the same including, said pipe sections, adjacent said joint being formed with exterior circumferential grooves spaced outwardly from the ends thereof, said coupling housing being formed of a plurality of segmental sections of a cylinder assembled together in cylindrical form on to the pipe ends being joined, each of said segments including a base portion, radially inwardly extending side portions extending inwardly from said base portion and forming a gasket recess therewithin, key sections extending radially inwardly from said side portions, extending into the grooves of said pipe but of less width and of greater inner diameter than the diameter of the bottom of said groove, and said side portions being formed with concentric laterally outwardly extending wing portions, said wing portions overlying the surface of said pipes outwardly of said coupling grooves, the inner diameter of said wing portions being only slightly greater than the outer diameter of said pipe whereby movement of either of said pipe out of its normal axial alignment is checked by the engagement of said inner wing surface with said pipe surface and a gasket in said gasket recess having portions overlying said pipe ends and engaging the portions of said pipe inwardly of said grooves.

4. A joint as in claim 3, said coupling housing being formed of relatively strong rigid material and said pipe sections being formed of somewhat yieldable plastic material.

5. A joint as in claim 4, said wing portions overlying said pipe at spaced positions about the circumference of said pipe.

6. A joint as in claim 4, the clearance between the interior surface of said wings and the exterior surface of said pipe lying between 0.010 and 0.014.

7. A joint as in claim 4 and including reinforcing ribs extending transversely of said segments across the outer surface of the same, said ribs engaging the exterior of said wing portions to prevent radial outwardly flexing of the same.

8. A pipe joint made up of sections of grooved end pipe and a coupling surrounding the same including, said pipe sections, adjacent said joint being formed with exterior circumferential grooves spaced outwardly from the ends thereof, said coupling housing being formed of a plurality of segmental sections of a cylinder secured together in cylindrical form on the pipe ends being joined, each of said segments including a base portion, radially inwardly extending side portions extending inwardly from said base portion and forming a gasket recess therewithin, a gasket within said gasket recess, key sections extending radially inwardly from said side portions, extending into the grooves of said pipe but of less width and of greater inner diameter than the diameter of the bottom of said groove, and said side portions being formed with concentric laterally outwardly extending wing portions, said wing portions overlying the surface of said pipes outwardly of said coupling grooves, the inner diameter of said wing portions in an unassembled, unstressed, state being only slightly greater than the outer diameter of said pipe, and ring means for encircling the exterior of said wing portions to stress said wing portions and force said wing portions tightly against the outer surface of said pipe throughout the overlying extent thereof, to prevent movement of either of said pipes out of its normal axial alignment.

9. The joint of claim 8, said wing portions overlying said pipe at spaced positions about the circumference of said pipe.

* * * * *